Feb. 23, 1960  A. B. MOJONNIER ET AL  2,925,835
AUTOMATIC FILLING AND WEIGHT CHECKING MACHINE
Filed March 31, 1958  2 Sheets-Sheet 2
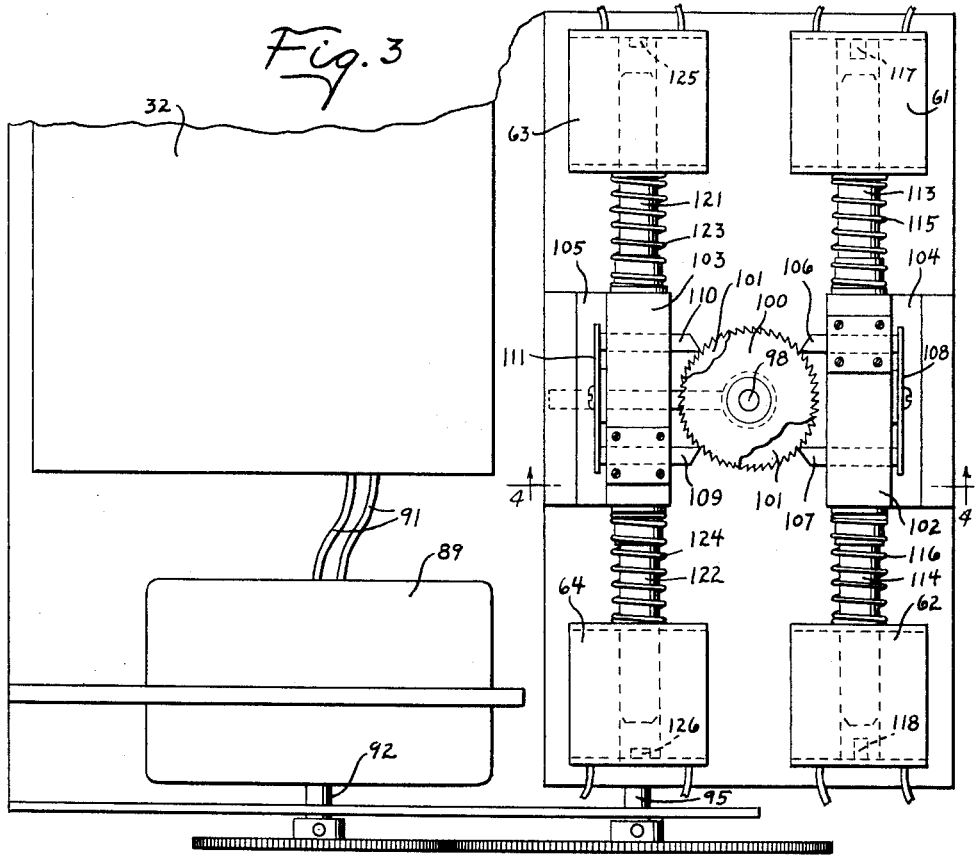
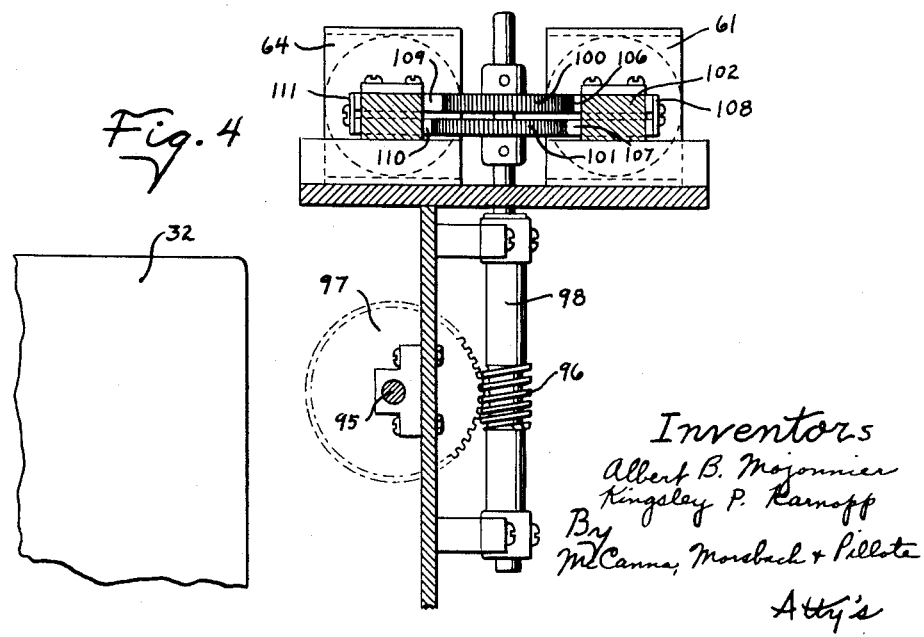
Inventors
Albert B. Mojonnier
Kingsley P. Karnopp
By
McCanna, Morsbach & Pillote
Atty's

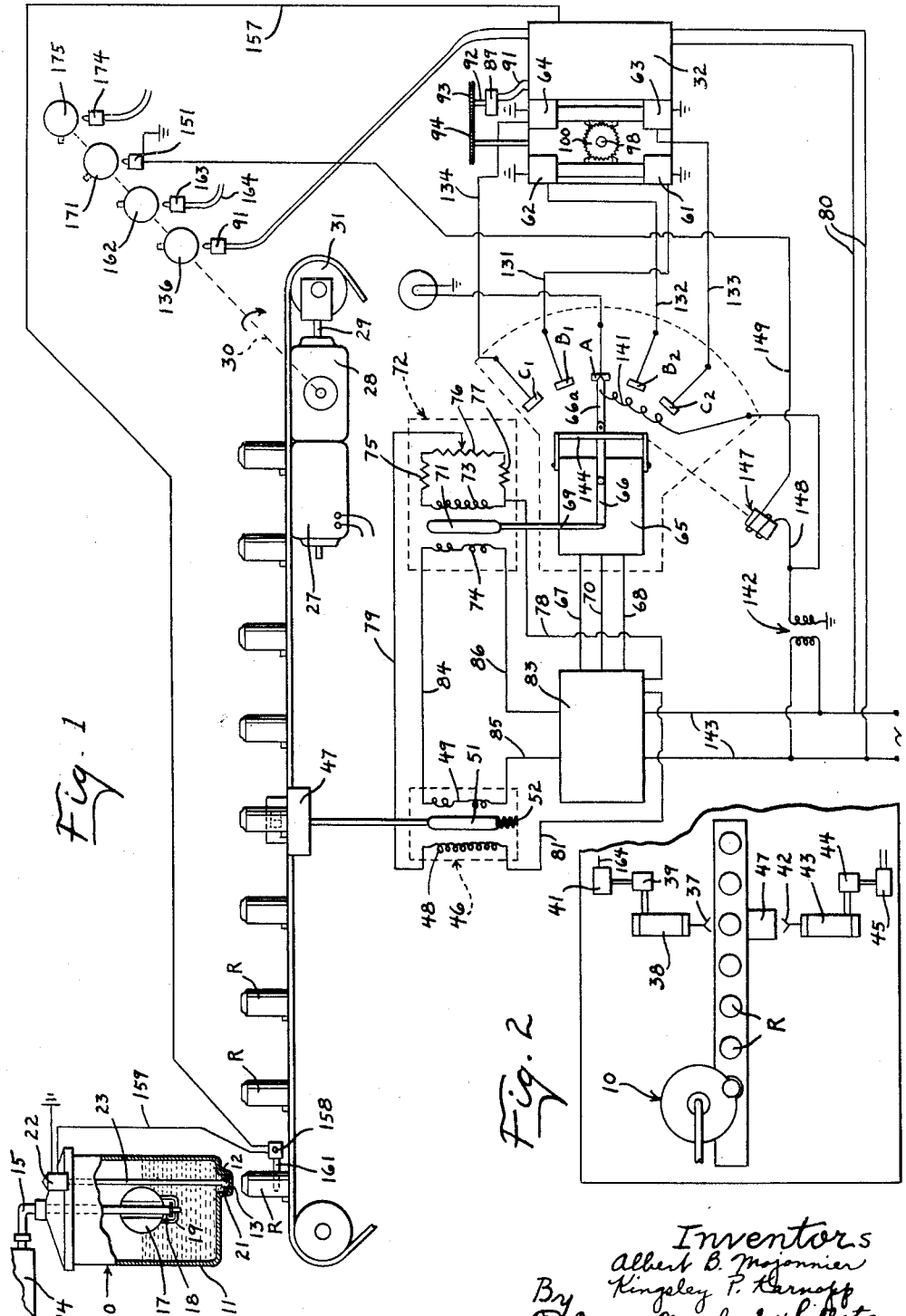

United States Patent Office 2,925,835
Patented Feb. 23, 1960

2,925,835

AUTOMATIC FILLING AND WEIGHT CHECKING MACHINE

Albert B. Mojonnier, Chicago, and Kingsley P. Karnopp, Prairie View, Ill., assignors, by direct and mesne assignments, to Kartridg-Pak Machine Co., Chicago, Ill., a corporation of Iowa Application March 31, 1958, Serial No. 724,990

7 Claims. (Cl. 141—83)

This invention relates to liquid dispensing apparatus.

The present invention relates to improvements in the filling apparatus disclosed in the patent to A. B. Mojonnier, Re. 23,830 for dispensing mechanism with time control flow. In general, that dispensing mechanism includes a liquid container having a discharge orifice; means for maintaining the liquid in the container at a constant level to provide a preselected head above the orifice; a valve for controlling flow through the orifice, and means including a timer operable to open the discharge valve for a selectively variable time interval to thereby dispense a volume of liquid from the container. This dispensing mechanism will accurately and repetitively dispense a preselected volume of liquid determined by the time interval during which a discharge valve is open; the size of the orifice, and the head of liquid in the container above the orifice, provided that the viscosity of the liquid being dispensed remains substantially constant.

However, since the amount dispensed per unit of time by the above-described dispensing mechanism is dependent on the rate of flow of the liquid through a given orifice, changes in viscosity of the liquid will change the volume of the liquid dispensed. Thus, an increase or decrease in viscosity will respectively decrease or increase the rate of flow through a given orifice and correspondingly change the volume dispensed for any given setting of the timer.

It may also be noted that the changes in viscosity are usually accompanied by a change in density of the liquid being dispensed due to expansion and contraction of the liquid, with changes in temperature. Thus, as the temperature of the liquid rises, the viscosity generally decreases and the volume of the liquid expands. Conversely, when the temperature drops, the volume of the liquid generally contracts. If the volume measured by the filler always remained constant, then the "effective" volume of liquid dispensed by the filler would vary. In order to dispense the same "effective" volume from the filler, the "measured" volume must be changed, when the temperature of the liquid changes, in proportion to the expansion or contraction of the liquid incident to that change in temperature. In general, the change in density or volume of the liquid, with changes in temperature, is different from the change in the rate of flow of the liquid through an orifice incident to the change in liquid temperature, so that the "effective" volume of liquid dispensed by the aforementioned dispensing mechanism will change with temperature.

In practice it has been found that the temperature of the liquid in the dispenser container frequently changes gradually during a filling run. At present, it is necessary to either manually check and adjust the filler at frequent intervals to compensate for the temperature changes or to allow some over or underfilling to occur when the liquid temperature changes.

In accordance with the present invention, provision is made for adjusting the time interval during which the discharge valve of the dispensing mechanism is held open by the timer in such a manner as to maintain the effective volume of liquid dispensed by the mechanism substantially constant, notwithstanding changes in viscosity and density of the liquid. In general, this is achieved by weighing the receptacles which have been filled by the dispensing mechanism and adjusting the time interval measured by the timer in such a manner as to compensate for the gradual or "trend" variations in the volume of liquid being dispensed from a preselected standard while disregarding minor random fluctuations in the weight of the filled receptacle, as would be caused by the small "tare" variations in the weight of the different empty receptacles.

An important object of this invention is to provide an improved dispensing mechanism of the type wherein the volume of liquid dispensed is determined by the rate of flow through a fixed orifice and the time during which the orifice is open, and which has means for automatically compensating for trend variations in the volume of liquid dispensed due to gradual changes in the viscosity and density of the liquid.

Another object of this invention is to provide a dispensing mechanism wherein liquid is dispensed through an orifice and the orifice size and head of liquid above the orifice are maintained constant, and in which the time during which the discharge valve is maintained open is automatically varied to compensate for changes in viscosity and density of the liquid being dispensed.

A more particular object of this invention is to provide a dispensing mechanism in accordance with the foregoing object, in which the filled receptacles are weighed after being filled and the timer for operating the dispensing mechanism automatically adjusted in accordance with the deviation in the weight of the filled receptacle from a standard weight to increase or decrease the time interval during which the discharge valve is held open.

A further object of this invention is to provide an improved electrically operated apparatus for adjusting the timer.

These, together with various ancillary objects and advantages of this invention will be more readily appreciated as the same is better understood by reference to the following detailed description when taken in connection with the accompanying drawings:

Figure 1 is a diagrammatic view of the filler mechanism and illustrating a control circuit therefor;

Fig. 2 is a top view of a filler apparatus and illustrating the arrangement of the filler, the conveyer and the weighing scale;

Fig. 3 is a top plan view of the timer and the mechanism for adjusting the timer, and Fig. 4 is a vertical sectional view taken on the plane 4—4 of Fig. 3.

The dispensing mechanism 10 is of the general type disclosed in the patent to A. B. Mojonnier, Re. 23,830, and includes a container 11 having a discharge nozzle 12 at the lower end thereof which terminates in a fixed orifice 13. Liquid is supplied to the container 11 as from a storage tank 14 through a pipe 15. The pipe extends downwardly into the container and provision is made for controlling the flow of fluid through the pipe 15 into the container to maintain the liquid in the container at a substantially constant level. As shown herein, a float 17 is slidably mounted on the pipe 15 within the container 11 and carries a valve member 18 on a U-shaped bail 19, which valve member cooperates with the end of the pipe 15 to block the flow of liquid into the container when the liquid in the container reaches a preselected level. The float thus operates to maintain a preselected "head" of liquid in the container 11 above the orifice 13. A valve 21 is provided for controlling the flow of liquid through the orifice 13 and is electrically operated from its normally closed position to an open position by a solenoid 22. The solenoid is conveniently mounted on the cover of the container 11 and is operatively connected by the rod 23 to the valve 21.

A conveyor 25, herein shown of the continuous belt type, is provided for advancing the receptacles R to a filling station below the dispensing mechanism 10, and from the filling station to a weighing station and from the weighing station to a discharge station. The conveyor 25 is preferably operated to intermittently advance the receptacles R and as shown there is provided a motor 27 which is connected through an intermittent drive mechanism 28 and shaft 29 to a conveyor drive pulley 31. The intermittent drive 28 may be of any conventional construction which is operative to advance the conveyor a distance corresponding to the spacing between the adjacent receptacles R thereon and then provide a "dwell" time during which the receptacles may be filled. For reasons set forth more fully hereinafter, a cam shaft 30 is operatively connected to the conveyor drive mechanism 28 and the drive therefor arranged so as to rotate the cam shaft through one revolution during the time interval required to complete one cycle of operation of the conveyor 25.

A timer 32 is provided for energizing the solenoid 22 of the discharge mechanism during the dwell period of the conveyer 25, for a selectively variable time interval. Since the size of the orifice 13 and the head of liquid in the container 11 above the orifice is maintained constant, the rate of flow of liquid through the orifice 13 will be proportional to the time during which the orifice is open. For any given time setting the aforedescribed dispensing mechanism will operate to accurately and repetitively dispense the same volume of liquid within relatively narrow limits, provided that the viscosity of the liquid does not vary.

At the beginning of a run, the timer 32 is adjusted so as to open the valve 22 for a time interval sufficient to permit a preselected volume of the liquid in the container 11 to flow into the receptacle R therebelow. If the temperature of the liquid in the container 11 varies from the temperature at the beginning of the run, the viscosity of the liquid in the container and the density of the liquid will vary. When the temperature rises from the initial or starting temperature, the viscosity will decrease and the rate of flow of liquid through the orifice 13 will correspondingly increase. The temperature rise will also cause the liquid in the container to expand slightly so as to reduce the density of the liquid. The change in the rate of flow of the liquid with changes in temperature is generally high as compared to the expansion or contraction of the liquid with the corresponding change in temperature so that the effective volume of liquid introduced into the receptacles R will increase when the temperature of the liquid increases and decrease when the temperature of the liquid in the container decreases.

In accordance with the present invention, provision is made for automatically adjusting the timer 32 to vary the time interval during which the solenoid 22 maintains the discharge valve 21 open in such a manner as to maintain the effective volume of liquid introduced into the receptacles R substantially constant. This is achieved in such a manner as to compensate for the gradual or trend variations while substantially disregarding the random fluctuations in weight, such as are caused by variations in the individual weights of the receptacles R when empty.

More particularly, a weighing scale 46 is disposed adjacent the conveyer 25 and includes a weighing table 47 preferably disposed at the level of the conveyer 25. Mechanism is provided for transferring the receptacles R from the conveyer 25 onto the table 47 and for thereafter removing the receptacles from the table. As shown herein, this includes a first pusher mechanism comprising a receptacle engaging jaw 37 (see Fig. 2) which is reciprocated crosswise of the conveyer 25 by means of a fluid operator 38 to position the receptacle R on the table 47. The fluid operator 38 is conveniently controlled by a reversing valve 39 which is operated by a solenoid 41 in a manner described more fully hereinafter. A second pusher mechanism including a jaw 42 operated by a hydraulic mechanism 43 is provided for returning the receptacles from the weighing scale back onto the conveyer 25. The fluid operator 43 is also conveniently operated by a reversing valve 44 controlled by a solenoid 45.

The weighing scale 46 may be of any conventional construction which is arranged to produce an electrical output signal correlative with the deviation of the weight of the receptacle R from a standard weight. As shown herein, the weighing scale is of the type employing a differential transformer including an energizing winding 48, a differential output winding 49 and a movable core 51 which is operatively connected to the scale platform. The core 51 and platform are yieldably supported as by a spring 52. The voltage induced in the two halves of the differential secondary winding 49 will be equal and opposite when the core 51 is disposed in a mid-position and the scale is adjusted so that the core will be disposed in this central position when a weight corresponding to the standard weight is applied to the scale platform 47. If a weight is thereafter applied to the scale platform which differs from the standard weight, the core 51 will be displaced from its mid-position so that the voltage output of the differential secondary windings 49 will vary in amplitude and phase correlative with the direction and amplitude of the displacement of the core 51 from its mid-position. This produces an output electrical signal from the differential scale transformer which is correlative with the deviation of the weight of the filled receptacle from a standard weight.

An apparatus is provided for adjusting the interval of the timer in accordance with the output signal from the scale 46. In accordance with the present invention, the interval measured by the timer is adjusted in a direction to increase or decrease the time interval dependent upon whether the receptacle R is either underfilled or overfilled. It is also a feature of the present invention that the magnitude of the correction applied to the timer is correlated with the magnitude of the deviation of the filled receptacle from a standard weight and is made insufficient to completely compensate for the deviation in a single operation of the timer adjusting means. This arrangement prevent "hunting" of the dispensing mechanism and also improves the immunity of the apparatus to minor random fluctuations due to differences in the weight of the empty receptacles R. In the specific apparatus illustrated, four step-type operators are provided for adjusting the time interval measured by the timer, one pair of operators being arranged to apply a small correction to the timer in relatively opposite directions and the other pair of operators being arranged to apply a relatively greater correction to the timer, in relatively opposite directions.

The step-type operators for adjusting the timer 32 include four solenoids designated 61–64 respectively and an apparatus is arranged to selectively operate one of the solenoids 61–64 in accordance with the magnitude and direction of the deviation of the weight of the filled receptacle from the standard weight. This apparatus conveniently includes a galvanometer-type instrument 65 having a swingably supported member 66 which is movable from a null position in either one direction or the other in accordance with the amplitude and polarity of the signal applied thereto. The instrument 65 is arranged in a closed servo loop with the scale transformer 46 and, as shown is connected through a link 69 to the movable core 71 in a control transformer 72. The control transformer has energizing windings 73 and differential windings 74. A sensitivity control, including resistors 75, 76 and 77, is connected in parallel with the energizing winding 73 and the windings 73 and 48 are operatively connected to a source of A.C. supply by means of a circuit including conductor 78, conductor 79 which is connected to a tap on the resistor 76 and to one side of the winding 48, and conductor 81. The differential windings 49 and 74 are operatively connected to each other and to a phase sensitive servo amplifier 83 by means of conductors 84, 85 and 86 in such a manner that the output voltage of the control transformer 72 will oppose the output voltage of the scale transformer 46, the differences between these output voltages being applied to the phase-sensitive servo amplifier. The amplifier produces an output signal having an amplitude and polarity corresponding to the amplitude and phase of the "error" signal applied thereto from the differential windings 49 and 74. When the weight applied to the scale platform 47 deviates from the standard weight, the scale transformer produces an output signal correlative in amplitude and phase with this deviation and the same is applied to the servo amplifier which energizes the instrument 65 through conductors 67, 68 and 70 to move the member 66 away from its null position in a direction corresponding to the amplijtude and phase of the output signal from the differential windings 49. The member 66 moves the core 71 in a control transformer 72 through link 69 and produces an output signal from the differential winding 74 corresponding to the displacement of the core 71 from its neutral position. When the output signal of the winding 74 is equal and opposite to the output signal from the winding 49, a "zero" error signal is applied to the servo amplifier so that further deflection of the member 66 from its null position is stopped. The member 66 remains in this displaced position until the weight is removed from the scale platform 47 at which time the member 66 returns to its null position.

The timer 32 is of the electronic type which is connected to a source of supply through conductors 80. The timer is arranged to be fired in response to closing of a switch 91 and, when fired, to energize a circuit and maintain the same energized for a preselected selectively variable time interval. The duration of operation of the timer, after firing, is selectively controlled by means of a potentiometer 89 which is operatively connected to the timer through conductors 91. The potentiometer 89 has a control shaft 92, which control shaft is connected through spur gears 93 and 94, shaft 95, worm and pinion 96 and 97 to a shaft 98 having oppositely arranged ratchet wheels 100 and 101 thereon.

Slide bars 102 and 103 are mounted in guideways 104 and 105 adjacent opposite sides of the ratchet wheels 100 and 101. Pawls 106 and 107 are slidably mounted in the slide bar 102 for movement in a direction perpendicular to the direction of movement of the slide bar and are yieldably urged by a leaf spring 108 in a direction toward the ratchet wheels. The pawls are vertically offset with respect to each other as shown in Fig. 3 and respectively engage the ratchet wheels 100 and 101.

A similar pair of pawls 109 and 110 are mounted on the slide bar 103. The pawls 109 and 110 are also vertically offset from each other and urged by a leaf spring 111 into engagement with the ratchet wheels 100 and 101.

The slide bar 102 is operatively connected to the movable armatures 113 and 114 of the solenoids 61 and 62 respectively, and springs 115 and 116 are interposed between the solenoids and a collar on the respective armature to yieldably urge the armatures to the extended position shown in Fig. 3. Stops 117 and 118 are provided in the solenoids 61 and 62 respectively to limit the travel of the armatures 113.

The slide block 103 is similarly connected to the armatures 121 and 122 of the solenoids 63 and 64 and springs 123 and 124 are interposed between the the solenoids and a collar on the respective armature to yieldably urge the armatures outwardly to the neutral position as shown in Fig. 3. Stops 125 and 126 are also provided in the solenoids to limit movement of the respective armatures. For reasons set forth more fully hereinafter, the stops 125 and 126 are positioned so as to permit the respective armatures 121 and 122 to move through a relatively greater distance than the armatures 113 and 114 of the solenoids 61 and 62. The solenoids 61–64 are respectively connected through conductors 131–134 to contacts B1, B2, C2 and C1 respectively of the polarity sensitive instrument 65.

The tip 66a of the movable member 66 in the instrument 65 is arranged as an electrically conductive contact and is connected through a wire 141 to a transformer 142 which is energized from the power conductors 143. A clamp bar 144 is mounted on the instrument 65 and arranged to engage the member 66 to press the conductive tip 66a thereof into engagement with the contact element A, B1, B2, C1 or C2 therebelow. The clamp bar may conveniently be operated by means of a solenoid 147 which is connected through conductors 148 and 149 and interrogation switch 151 to the source of power.

The firing of the timer 32 to effect dispensing from the apparatus 10; the transfer of the receptacles R onto and off from the scale platform 47, and the application of the signal from the instrument 65 to the respective control solenoids 61–64 are all operated in timed relation with the operation of the conveyer 25 and the advance of receptacles therealong. The conveyer drive motor 27 and intermittent drive mechanism 28 operate to advance the conveyer 25 to move the receptacles R from one position to the next succeeding position thereof. A cam 136 on the cam shaft 30 then operates the timer firing switch 91 to energize the timer through a circuit including conductor 157, switch 158 and conductor 159 which is connected to the discharge valve operating solenoid 22. The switch 158 is normally open and is positioned adjacent the nozzle 12 so that the operating finger 161 thereof may engage a receptacle R in filling position below the nozzle. When a receptacle is in filling position, the switch is closed so that the timing impulse applied to conductor 157 will be transmitted through switch 158 to the conductor 159 and solenoid 22 to open the dispensing valve. Simultaneously, a means such as a cam 162 operates a switch 163 which is connected through conductors 164 to a source of power and to the valve operating solenoid 41 to extend the pusher 37 and move a receptacle from the conveyer onto the weighing platform. After a brief time interval sufficient to allow the member 66 of the galvanometer 65 to move to a position correlative with the deviation in weight of the filled receptacle from a standard weight, the interrogation switch 151 is operated, as by a cam 171 also on the cam shaft 32. One of the solenoids 61–64 is then operated, if the filled receptacle deviates more than a preselected amount from the standard weight, one of the solenoids 61 and 62 being operated in response to a relatively small positive or negative deviation while the solenoids 63 and 64 are operated for a relatively larger positive or negative deviation. The amount of correction applied by the solenoids 61–64 to the potentiometer and timer 32 is made such as to be insufficient to completely correct for the entire deviation in weight, in a single resetting of the timer, so as to prevent hunting of the filler mechanism and to improve the immunity of the same to random fluctuations in weight. After the timer is corrected, the interrogation switch is opened and a valve operating switch 174 closed as by a cam 175 to thereby operate the valve operating solenoid 45 to return the receptacle back onto the conveyer. With a single conveyer in which the receptacle is removed from the conveyer and then transferred back onto the conveyer, it is apparent that the weighing operation and the correction of the timer must be effected while the conveyer is idle. However, if a second conveyer is provided and the containers moved from the first conveyer 25 onto the scale platform 47 and from the scale platform onto a second conveyer, it is apparent that the weighing operation and the correction of the timer can be effected even while the first conveyer is moving.

From the foregoing it will be seen that the variation in the effective volume of liquid dispensed by the dispensing mechanism, which occur in this type mechanism with the changes in viscosity and density incident to changes in temperature, will be automatically corrected by the adjustment of the timer. If the viscosity or density of the liquid in the container 11 changes and causes overfilling or underfilling, successive cans will be either overfilled or underfilled so that successive corrections will be made on the timer in a direction to overcome the deviation. Since the filler is highly accurate except for the above-mentioned changes in viscosity and density, the amount dispensed will not fluctuate in random fashion but will instead vary gradually as the density and viscosity change. However, the weight of the empty receptacles frequently vary slightly due to variations in manufacture. These weight variations of the receptacle are generally small and vary in random fashion. Since the weight sensitive mechanism only corrects the timer a relatively small amount each time the adjusting mechanism is actuated, it is apparent that a random deviation in empty weight of one receptacle will cause only a single small correction to be made on the timer and will not introduce a large error in the filling.

We claim:

1. An automatic filling apparatus comprising, a liquid dispenser having an outlet, means for supplying liquid to said dispenser, means operable to maintain a substantially constant pressure on the liquid at the dispenser outlet, a valve for dispensing liquid from the outlet of the dispenser into a receptacle, a solenoid for operating said valve, an interval timer for controlling energization of the solenoid, means for actuating said timer to energize said solenoid for a preselected time interval, said timer including means for adjusting the time interval during which said solenoid is energized, means for weighing at least some of the receptacles filled by said apparatus, and means actuated by said weighing means and responsive to the deviation of the weight of the filled receptacle from a preselected standard for operating said timer adjusting means in a direction to overcome said deviation.

2. An automatic filling apparatus comprising, a liquid dispenser having an outlet, means for supplying liquid to said dispenser, means operable to maintain a substantially constant pressure on the liquid at the dispenser outlet, a valve for dispensing liquid from the outlet of the dispenser into a receptacle, a solenoid for operating said valve, an interval timer for controlling energization of the solenoid, means for actuating said timer to energize said solenoid for a preselected time interval, said timer including means for adjusting the time interval during which said solenoid is energized, means for weighing at least some of the receptacles filled by said apparatus, and means actuated by said weighing means and responsive to the deviation of the weight of the filled container from a preselected standard for operating said timer adjusting means to change the measured time interval by an amount less than that required to overcome said deviation.

3. An automatic filling apparatus comprising, a liquid dispenser having an outlet, means for supplying liquid to said dispenser, means operable to maintain a substantially constant pressure on the liquid at the dispenser outlet, a valve for dispensing liquid from the outlet of the dispenser into a receptacle, a solenoid for operating said valve, an interval timer for controlling energization of the solenoid, means for actuating said timer to energize said solenoid for a preselected time interval, said timer including means for adjusting the time interval during which said solenoid is energized, means for weighing at least some of the receptacles filled by said apparatus, means actuated by said weighing means and responsive to a deviation within a preselected range of the weight of the filled receptacle from standard for operating said timer adjusting means to change the measured time interval by a fixed increment less than that required to overcome said preselected deviation, and means actuated by said weighing means and responsive to a deviation greater than said preselected range for operating said timer means to change the measured time interval by a relatively greater increment less than that required to overcome said last-mentioned deviation.

4. An automatic filling apparatus comprising, a liquid dispenser having an outlet, means for supplying liquid to said dispenser, means operable to maintain a substantially constant pressure on the liquid at the dispenser outlet, a valve for dispensing liquid from the outlet of the dispenser into a receptacle, a solenoid for operating said valve, an interval timer for controlling energization of said solenoid, means for actuating said timer to energize said solenoid for a preselected time interval, said timer including a potentiometer for adjusting the time interval during which said solenoid is energized, means for automatically varying the amount of liquid dispensed by said apparatus during each operation thereof to correct for gradual changes in the weight of the liquid dispensed, said last-mentioned means including means for weighing at least some of the receptacles filled by said apparatus, and means actuated by said weighing means and responsive to the deviation of the weight of a filled receptacle from a preselected standard for operating said potentiometer in a direction to overcome said deviation.

5. An automatic filling apparatus comprising, a liquid dispenser having an outlet, means for supplying liquid to said dispenser, means operable to maintain a substantially constant pressure on the liquid at the dispenser outlet, a valve for dispensing liquid from the outlet of the dispenser into a receptacle, a solenoid for operating said valve, an interval timer for controlling energization of said solenoid, means for actuating said timer to energize said solenoid for a preselected time interval, said timer including means for adjusting said time interval, scale means for producng an electrical signal correlative with the deviation of the weight applied thereto from a preselected standard, means for moving at least some of the receptacles from the filling means onto said scale means, a first control means for operating said timer adjusting means in a direction to increase the time interval measured by the timer by a preselected increment and a second control means for operating the timer adjusting means in the opposite direction to decrease the measured time interval by a preselected increment, and means responsive to said electrical signal produced by said scale means for selectively operating said first and second control means when the weight of the filled receptacle deviates a preselected amount respectively below and above a preselected standard.

6. The combination of claim 5 wherein said first and second control means each includes a solenoid, and means operatively connecting each of said last-mentioned solenoids to said timer adjusting means for operating the latter.

7. The combination of claim 5 wherein said first and second control means each includes a control solenoid, a ratchet wheel connected to said timer adjusting means for operating the latter, means including a pawl operated by one of said control solenoids engageable with said ratchet wheel for rotating the latter in one direction in response to operation of one of said control solenoids and means including a pawl operated by the other of said control solenoids for rotating the ratchet wheel in the other direction.

References Cited in the file of this patent

UNITED STATES PATENTS

| | | |
|---|---|---|
| Re. 23,830 | Mojonnier | May 18, 1954 |
| 2,622,766 | Simon | Dec. 23, 1952 |
| 2,712,408 | Weber | July 5, 1955 |
| 2,796,197 | Criddle | June 18, 1957 |

FOREIGN PATENTS

| | | |
|---|---|---|
| 142,491 | Australia | July 26, 1951 |